April 2, 1957      H. E. METCALF      2,787,593

METHOD AND MEANS OF PRODUCING STEAM IN NEUTRONIC REACTORS

Filed Feb. 21, 1946      2 Sheets-Sheet 1

Inventor:
Herbert E. Metcalf
By Robert A. Schroeder
Attorney

April 2, 1957   H. E. METCALF   2,787,593
METHOD AND MEANS OF PRODUCING STEAM IN NEUTRONIC REACTORS
Filed Feb. 21, 1946   2 Sheets-Sheet 2
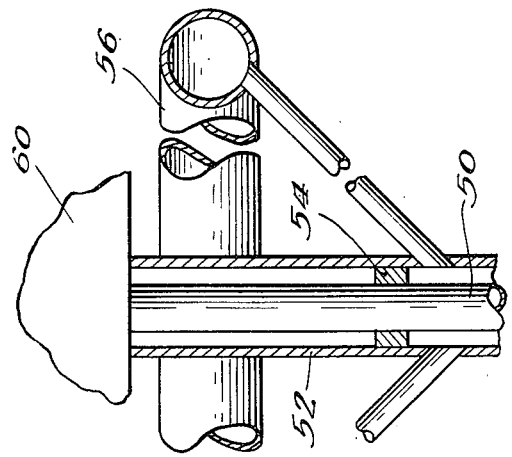
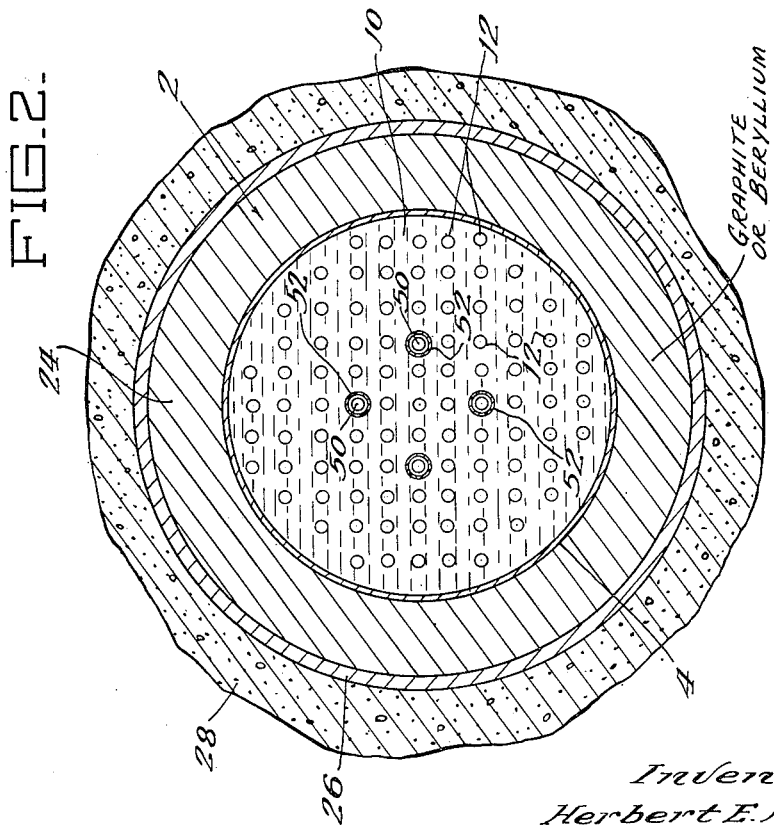
Inventor:
Herbert E. Metcalf
By Robert A. Loomis
Attorney United States Patent Office 2,787,593
Patented Apr. 2, 1957

2,787,593

METHOD AND MEANS OF PRODUCING STEAM IN NEUTRONIC REACTORS

Herbert E. Metcalf, Los Angeles County, Calif., assignor to the United States of America as represented by the United States Atomic Energy Commission Application February 21, 1946, Serial No. 649,408

12 Claims. (Cl. 204—154)

This invention relates to atomic power plants and more particularly to a novel method and means for producing steam by utilizing the heat of a nuclear fission chain reaction within a neutronic reactor.

In neutronic reactors a thermal neutron fissionable (herein called merely "fissionable," as is common in the art) isotope such as $U^{233}$, $U^{235}$, or $94^{239}$ or mixtures thereof is subjected to fission by absorption of neutrons and a self-sustaining chain reaction is established by the neutrons evolved by the fission. In general, such reactors comprise bodies of compositions containing fissionable material such, for example, as natural uranium, disposed in a neutron slowing material which slows the neutrons to thermal energies. Such a slowing material is termed a neutron moderator. Carbon and $D_2O$ (heavy water) are typical moderators suitable for such use. Heat is evolved during the reaction which is removed by passage of a coolant through the reactor in heat exchange relationship therewith. Specific details of the theory and essential characteristics of such reactors are set forth in copending application of Enrico Fermi and Leo Szilard, Serial No. 568,904, filed December 19, 1944, now Patent No. 2,708,656, granted May 17, 1955.

A general object of the invention is to utilize the heat of a nuclear fission chain reaction to produce steam which is superheated by flowing through the reactor in heat exchange relationship with neutron absorbers disposed therewithin and adapted to be heated by nuclear reaction resulting from neutron bombardment.

Another object of the invention is to design a neutronic reactor system wherein a liquid neutron moderator is circulated through the reactor in heat exchange relationship with the fissionable material therein, the heated moderator being flashed into steam which is circulated through the reactor in heat exchange relationship with neutron absorbent structure adapted to superheat the steam.

Still another object of the invention is to design a neutronic reactor, such as above described, wherein neutron absorbent tubes or conduits extend through the neutron moderator and are insulated therefrom, said tubes being adapted to convey steam which is superheated by heat developed within the tubes as the result of neutron bombardment thereof.

During the interchange of neutrons in a system of finite size comprising uranium disposed within neutron moderator, neutrons may be lost to the chain reaction in four ways:

1. By absorption of capture in the uranium without producing fission;
2. By absorption or capture in the moderator;
3. By absorption or capture in impurities present in both the uranium and the moderator; and
4. By leakage out of the system through the periphery thereof.

Inasmuch as a considerable number of neutrons are constantly lost from the periphery of the neutronic reactor, the neutron density therewithin is normally greatest at the center thereof. For this reason, nuclear fission and heat generation due to the chain reaction are both greatest at the center of the reactor and least at its edges, both activities following an approximate cosine curve distribution from the center to the edge of the reactor, as more fully pointed out in a copending application of Gale J. Young, Serial No. 649,398, filed February 21, 1946. Such a centrally peaked activity limits the total power at which the reactor can operate to a power whereat the central uranium bodies are operating at a maximum permissible temperature. In other words, the temperature of the uranium at the center of the reactor is a controlling factor. It is, therefore, another object of the invention to provide a neutronic reactor, such as above described, wherein the neutron absorbent steam conduits or tubes are disposed within a central portion of the reactor, thereby flattening the neutron density curve thereacross and increasing the total power output and plutonium production of the reactor, as more fully described in said Young application.

The foregoing and other objects and advantages of the invention will become apparent from a consideration of the specification and the accompanying drawings, wherein:

Fig. 2 is a sectional view taken in the horizontal plane indicated by the line 2—2 of Fig. 1; and Fig. 3 is an enlarged fragmentary view of a portion of the structure shown in Fig. 1, illustrating in detail one of the neutron absorbent steam conduits and the heat insulating means associated therewith.

Figure 1:
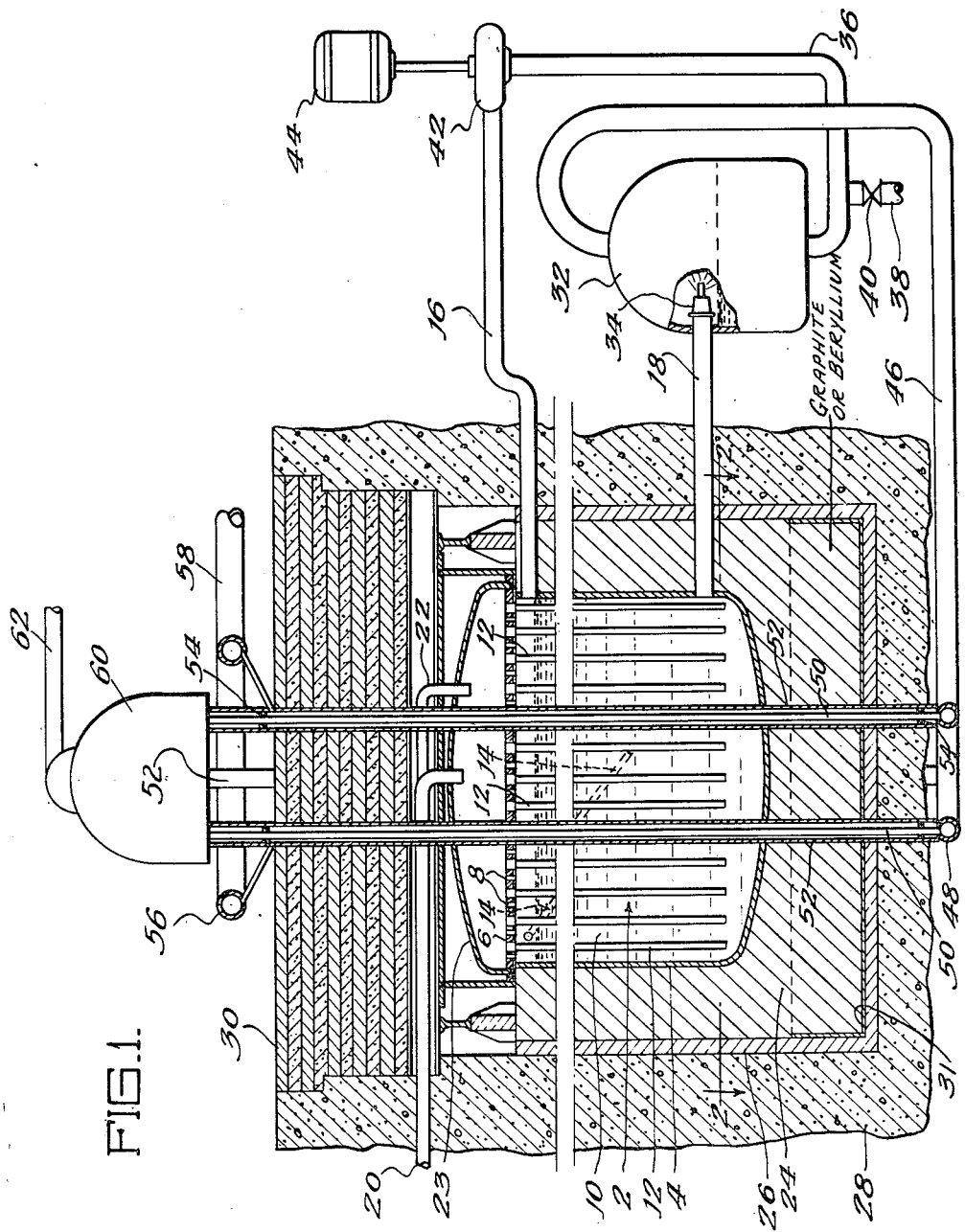
Fig. 1 is a flow diagram of a neutronic reaction system embodying the invention, the neutronic reactor being diagrammatically illustrated in central vertical section.

Describing the invention in detail, the neutronic reactor generally designated 2 is disposed within a tank or container 4 of neutron permeable material having a relatively small neutron capture cross section, such as, for example, aluminum or stainless steel. A cover 6 is provided on the top of the tank 4 having a plurality of passages 8 serving a purpose hereinafter described.

The neutronic reactor 2 comprises a body or mass 10 of liquid neutron moderator, within which is disposed fissionable material, preferably in the form of aluminum coated uranium rods 12 supported from the cover 6 in any convenient manner. It will be understood that the uranium may be in its metallic state or in the form of any suitable compound thereof and may contain a natural or an enriched isotopic content of fissionable material, as more fully discussed in the above mentioned Fermi and Szilard application. Neutron density within the reactor 2 is regulated by a control rod 14 and is monitored by any conventional means (not shown).

The neutron moderator is a liquid, such as ordinary or heavy water, which is circulated through the tank 4 by inlet and outlet pipes or conduits 16 and 18, respectively, and the moderator is maintained under superatmospheric pressure by means of a gas, such as helium, circulated through the tank 4 by means of inlet and outlet pipes or conduits 20 and 22, respectively, extending through a sealed cover plate 23 mounted on the cover 6. It will be understood that the helium, which is preferably maintained at any desired superatmospheric pressure, may pass freely through the passages 8 to maintain pressure on the upper surface of the moderator mass 10. Furthermore, it may be noted that the helium circulating through the tank 4 functions to sweep therefrom the hydrogen and oxygen resulting from dissociation of the water within the reaction tank due to neutron bombardment of the water.

It may be noted that the tank 4 is disposed within a solid neutron reflector 24 of any suitable material, such as graphite or beryllium, said reflector being adapted to reduce neutron losses from the periphery of the reactor. The reflector 24 is, in turn, disposed within a pressure tank 26 which is contained within a concrete vault 28 closed at the upper extremity thereof by a cover 30 formed of alternate layers of iron and compressed wood fiber of the type commonly known as "masonite". The lower portion of the tank 26 is lined by a drip pan 31, to retain any liquid leaking from the tank 4. It will be understood that the vault 28 and the cover 30 form a biological shield around the reactor adapted to absorb biologically harmful emanations, such as neutrons and alpha, beta and gamma rays resulting from the nuclear fission chain reaction within the reactor 2.

The water neutron moderator or mass 10 is heated by neutron bombardment and by its contact with the uranium members 12 to a temperature in excess of 100° C., and the heated water is flashed into steam within a steam chamber 32, receiving the outlet conduit 18, which is provided with a nozzle 34 within the chamber 32. It may be noted that a portion of the steam within the chamber 32 is condensed and is drained therefrom into a pipe or conduit 36 connected to a make-up line 38 through a conventional shut-off valve 40 and connected to the suction side of a conventional pump 42 operated by a motor 44, the discharge side of the pump being connected to the before-mentioned moderator inlet conduit 16.

The steam within the chamber 32 flows through a pipe or conduit 46 connected to a steam inlet header 48, which is connected to a plurality of tubes or conduits 50 formed of a highly neutron absorbent material such as, for example, a boron steel alloy. The steam flows upwardly through the tubes 50 and is heated by contact therewith, inasmuch as the tubes are heated to a relatively high temperature by virtue of nuclear reaction therewithin, resulting from a neutron bombardment thereof.

Each tube 50 is afforded thermal insulation from the adjacent reactor structure by means of a vacuum pipe or tube 52 sealed adjacent opposite extremities thereof by glands 54 and connected adjacent the upper extremity thereof to a header 56 connected to a vacuum line 58, said line being connected to any suitable exhaust means, such a vacuum pump or tank (not shown). The vacuum pipes 52 are preferably formed of a neutron permeable material having a relatively small neutron capture cross section, such as aluminum or stainless steel. Thus, neutrons within the reactor 2 may freely penetrate the vacuum pipe 52 to bombard the neutron absorbent conduits 50, said conduits being thermally insulated from the reactor structure by means of the vacuum within the pipes 52. As above noted, the neutron absorption of the tubes 50 results in the heating thereof to relatively high temperatures, whereby the steam passing through these tubes is superheated. The superheated steam flows upwardly through the tubes 50 into a steam dome or chamber 60 connected to a suitable steam outlet line 62, through which the superheated steam is conveyed to be used for any desired purpose.

Although the theories of nuclear reaction set forth herein are based on the best presently known evidence, the invention is not limited thereto inasmuch as additional data later discovered may modify said theories.

It will be understood that the invention is not limited to the specific embodiment disclosed herein, inasmuch as various modifications thereof will be readily apparent to those skilled in the art without departing from the spirit of the invention or the scope of the appended claims.

What is claimed is:

1. In a system of the class described, a neutronic reactor comprising means for sustaining a nuclear fission chain reaction, said means including a neutron moderator consisting of a liquid and thermal neutron fissionable material dispersed therethrough, means for maintaining said moderator under superatmospheric pressure within said reactor, means for flashing said moderator into vapor at a point externally of said reactor, and means for conveying the vapor through said reactor to be superheated by the heat of said reaction.

2. In a system of the class described, a reaction chamber, a low pressure vapor chamber spaced therefrom, means in said reaction chamber for sustaining a nuclear fission chain reaction, said means comprising a neutron moderator consisting of a liquid and thermal neutron fissionable material disposed within said moderator, means for circulating said moderator through said chambers comprising inlet and outlet lines connected to said reaction chamber, said outlet lines being connected to said vapor chamber and having pressure-reducing means therein, a source of said moderator, and pump means in said inlet line, said pump means having the suction side thereof connected to said source, and means for conducting the vaporized moderator from said vapor chamber through said reaction chamber to absorb the heat of the chain reaction therein, whereby said vaporized moderator is superheated.

3. In a system of the class described, a reaction chamber, means therein for producing a nuclear fission chain reaction, said means comprising a neutron moderator consisting of a liquid and thermal neutron fissionable material in said moderator, means for diminishing neutron density in the central portion of said moderator comprising neutron absorbing means therein, moderator inlet and outlet lines connected to said reaction chamber, a source of said moderator under pressure connected to said inlet line, a low pressure vapor chamber connected to said outlet line, said outlet line having pressure-reducing means therein, whereby the heated moderator flowing from said outlet line is flashed into vapor within said steam chamber, and means for conveying the vapor from said vapor chamber through said reaction chamber in heat exchange relationship with said neutron absorbing means.

4. In a system of the class described, a reaction chamber, means therein for producing a nuclear fission chain reaction comprising a neutron moderator consisting of liquid and thermal neutron fissionable material, inlet and outlet lines connected to said chamber for circulating said moderator therethrough, pump means having its discharge side connected to said inlet line, a vapor chamber, a line connecting the bottom of said chamber to the suction side of said pump means, a moderator make-up line connected to the suction side of said pump means, said outlet line being connected to said vapor chamber through a nozzle adapted to flash the heated moderator into vapor within said vapor chamber, and means for superheating said vapor comprising means for conveying said vapor from said vapor chamber through said reaction chamber.

5. In a device for producing steam, a neutronic reactor comprising a reaction chamber containing a neutron moderator consisting of liquid and thermal neutron fissionable material, means for flashing said moderator into vapor externally of said chamber, and means for superheating the vapor comprising means for passing the same through said reaction chamber.

6. In neutronic reactor apparatus including a reactive mass of thermal neutron fissionable material and a moderator consisting of liquid, neutron absorbing members central of the mass of flatten the neutron density variation curve across the mass, and means for flashing the liquid moderator into vapor exterior to the mass, the improved construction wherein said absorbing members are in the form of conduits extending through the mass and coupled to the flashing means, whereby the vaporized moderator is superheated in said absorbing conduits.

7. The apparatus of claim 6 wherein the absorber conduits are thermally insulated from the liquid moderator.

8. In the method of converting nuclear energy to heat energy including the promulgation of a neutronic chain reaction in a reactive mass of thermal neutron fissionable material and a moderator consisting of a liquid, the absorption of neutrons centrally of the mass to flatten the neutron density variations curve across the mass, and the flashing of the liquid moderator into vapor externally to the mass, the improvement wherein the vapor is passed through the central portion of the reactor after vaporization and is superheated by the heat generated in said neutron absorption.

9. The improved method of claim 8 wherein the heat generated in said neutron absorption is restrained from entering the portion of the moderator which is in the liquid phase.

10. The method of operating a neutronic reactor having a moderator consisting of a liquid comprising the steps of heating the liquid moderator by the heat evolved from the neutron chain reaction, continuously circulating the entire neutron moderator through a point exterior to the neutronic reactor, flashing the liquid neutron moderator into vapor at said point, and conducting the vapor through the neutronic reactor, whereby the vapor is superheated.

11. The method of operating a neutronic reactor comprising the steps of claim 10 wherein the liquid moderator within the neutronic reactor is heated under a superatmospheric pressure.

12. The method of operating a neutronic reactor having a moderator consisting of liquid comprising the steps of heating the liquid moderator by the heat emanating from a neutronic chain reaction while maintaining the moderator under superatmospheric pressure, circulating the entire liquid moderator through a point exterior to the neutronic reactor, flashing the moderator into vapor at said point, absorbing radiations emanating from the neutronic chain reaction in radiation absorbing conduits traversing the neutronic reactor, and conducting the vapor through the conduits, thereby superheating the vapor.

References Cited in the file of this patent

UNITED STATES PATENTS

| | | |
|---|---|---|
| 1,461,213 | Dravo | July 10, 1923 |
| 2,429,035 | Steving | Oct. 14, 1947 |

FOREIGN PATENTS

| | | |
|---|---|---|
| 28,099 | Great Britain | July 9, 1914 |
| 125,433 | Great Britain | Apr. 24, 1919 |
| 114,150 | Australia | May 2, 1940 |
| 861,390 | France | Oct. 28, 1940 |
| 233,011 | Switzerland | Oct. 2, 1944 |

OTHER REFERENCES

Smyth: "Atomic energy for Military Purposes," pages 103, 104, and 177–180, August 1945. (Copy may be purchased from Superintendent of Documents, Washington 25, D. C.)

Goodman: "The Science and Engineering of Nuclear Power," volume 1, page 275, Addison-Wesley, (1947). (Copy in Patent Office Library.)

Kelly et al.: Physical Review 73, 1135–9 (1948). (Copy in Patent Office Library.)